UNITED STATES PATENT OFFICE.

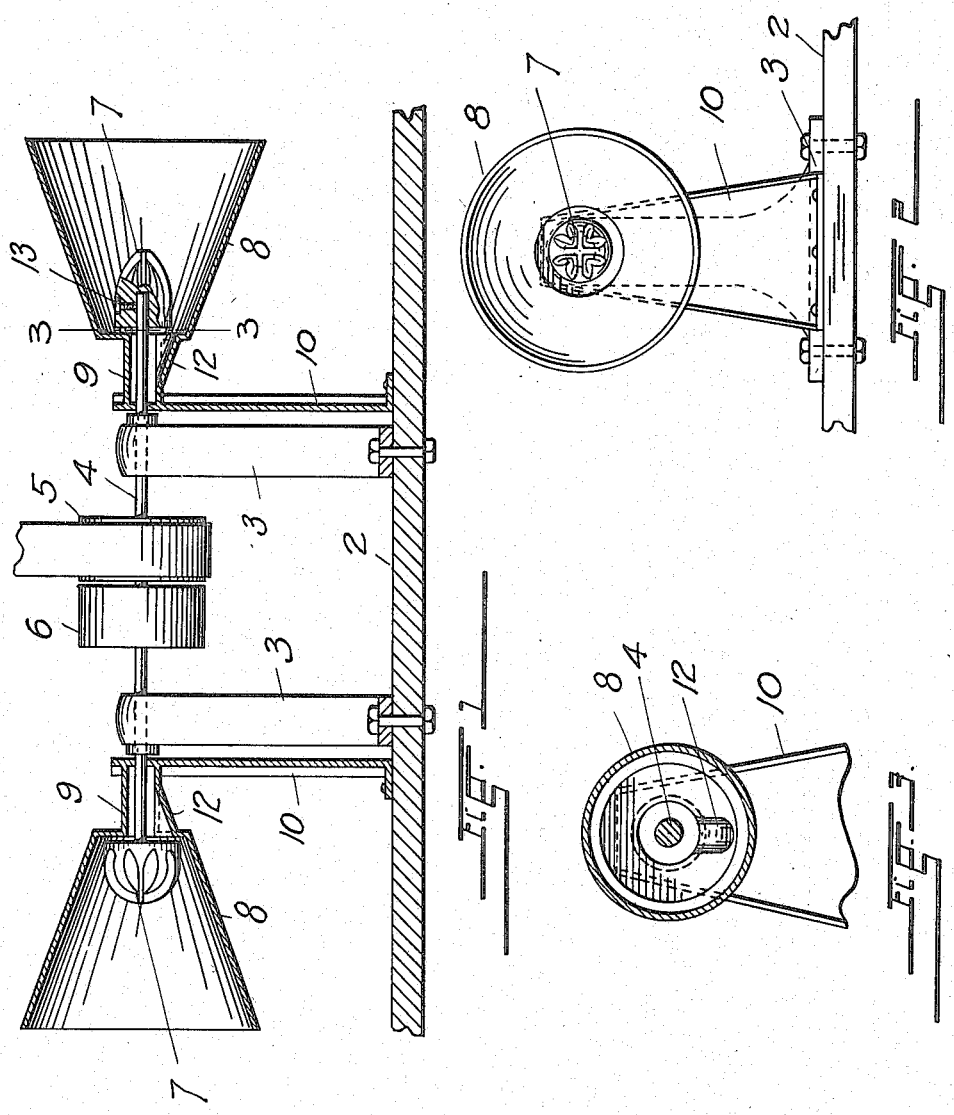

HARRY K. MORE, OF DENVER, COLORADO, ASSIGNOR OF ONE-HALF TO THE O. P. BAUR CONFECTIONERY COMPANY, OF DENVER, COLORADO, A CORPORATION.

JUICE-EXTRACTOR.

1,122,296.  Specification of Letters Patent. Patented Dec. 29, 1914.

Application filed April 2, 1913. Serial No. 758,411.

*To all whom it may concern:*

Be it known that I, HARRY K. MORE, a citizen of the United States, residing at Denver, in the county of Denver and State of Colorado, have invented certain new and useful Improvements in Juice-Extractors, of which the following is a specification.

This invention relates to a juice extractor of the type used to extract the juice from lemons, oranges and other fruits and its primary object resides in the provision of an apparatus of very simple construction by the use of which all of the juice contained in the fruit may be extracted in the minimum of time and without disturbing the oil contained in the rind thereof.

In proceeding in accordance with my invention I provide a rotary shaft, preferably power driven, which carries at its opposite ends exteriorly ribbed conoidal heads which are adapted to enter the half of a fruit pressed against them, and by their rotary motion extract the juice from the pulp contained therein, a suitable receiver is provided to conduct the extracted juice into a conveniently located receptacle, and the extractor-heads are detachably connected with the shaft so that they may be readily interchanged with others of different proportions, in accordance with the character, size and shape of the fruit from which it is desired to extract the juice.

Inasmuch as the fruit is, during the entire operation of extracting its juice, held in the hand of the operator, its rind does not come in contact with any part of the machine and is in consequence never subjected to sufficient pressure to extract the oil contained therein, which is of great advantage in a device of this character, inasmuch as the presence of this oil in the juice of the fruit, renders it bitter and rancid.

An embodiment of my invention has been shown in the accompanying drawings in the various views of which like parts are similarly designated, and in which, Figure 1 represents a sectional elevation of a machine constructed in accordance with my invention, Fig. 2, an end view of the same, and Fig. 3, a fragmentary section taken along the line 3—3, Fig. 1.

Referring to the drawings by numerical reference characters, the numeral 2 designates a suitable base or support upon which are mounted two standards 3 which provide bearings for the support of the rotary horizontal shaft 4. The shaft is provided at a point between the bearings, with fixed and loose pulleys 5 and 6 for its operative connection with a conveniently located driving medium, and it carries at its opposite ends, the conoidal extractor heads 7 which are externally ribbed to frictionally engage the pulp of the half of a fruit pressed against them.

The heads are attached to the shaft by means of set screws 13 which permit of their being readily interchanged with heads of different form or proportion, it being observed that in the drawing the head shown at the right-hand side of Fig. 1 is of small diameter in comparison with its length, for use in extracting the juice of fruits of oblong shape, such as lemons, while that at the other end of the shaft is shorter and of greater diameter to more closely conform with the shape of the half of a more spherical fruit, such as an orange.

The heads at the ends of the shaft are surounded by outwardly flaring, open-ended mantles 8 which in practice conduct the juice extracted by the action of the heads from the half of a fruit pressed against them by the operator, into subjacent receptacles.

Each mantle 8 is by means of a therewith axially alined, hollow neck 9, through which the shaft 4 loosely extends, rigidly connected with a standard 10 which is supported upon the base 2, and the said neck has in its lower surface an outwardly slanting gutter through which the juice which enters the neck is returned into the interior of the funnel-shaped mantle.

In the operation of the apparatus, the fruits after having been cut in halves, are pressed by hand against the heads at the ends of the continuously rotating shaft until all the juice is extracted therefrom by the action of the ribbed surface of the heads upon the pulp contained in the rinds of the fruit, the machine being preferably proportioned so that one operator can manipulate at the same time two halves of the fruit at opposite ends of the machine.

It has been found that the uniform, forceful movement of the shaft is very effective in quickly extracting every particle of the juice contained in the fruit without disturbing the oil contained in the rind of the same.

Having thus described my invention what I claim and desire to secure by Letters-Patent is:

1. In a juice extractor, a rotary horizontal shaft, an extractor head at an end thereof and a stationary, outwardly flaring mantle surrounding said head, and supported on a hollow neck through which the shaft loosely extends, said mantle being adapted to receive the juice extracted from a fruit held against said head and the said neck having a gutter adapted to return into the said funnel, juice which has entered the neck.

2. In a juice extractor, a rotary horizontal shaft, an extractor head at one end thereof, a mantle surrounding said head, a hollow neck through which the shaft loosely extends and at one end of which said mantle is mounted, said mantle being adapted to receive the juice extracted from a fruit held against the head, and the neck having a conductive part adapted to collect and discharge into the mantle juice which has entered the neck.

In testimony whereof I have affixed my signature in presence of two witnesses.

HARRY K. MORE.

Witnesses:
    G. J. ROLLANDET,
    L. RHOADES.